April 1, 1930.  A. R. SMITH  1,752,968
LOCK
Filed March 28, 1928
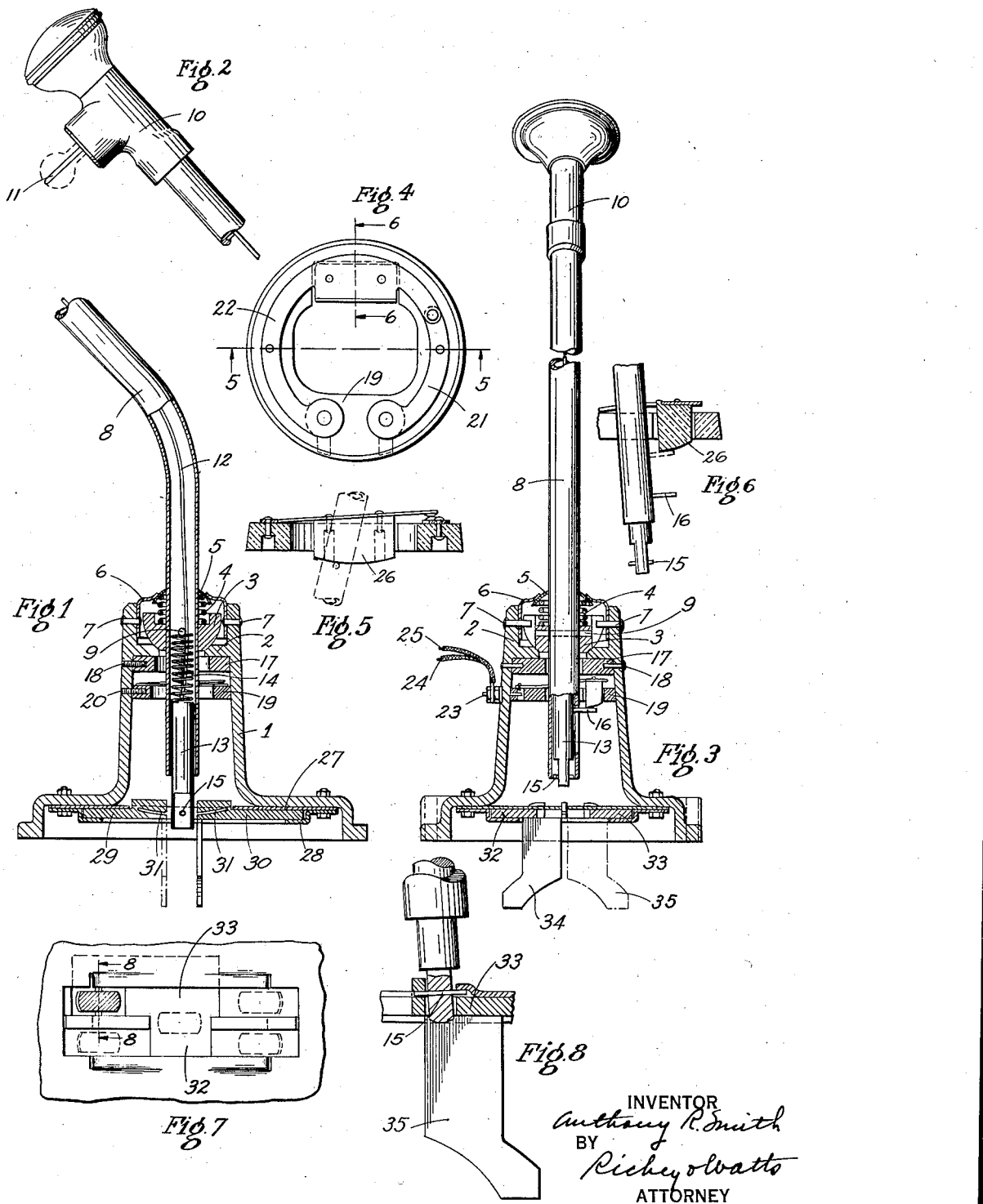
INVENTOR
Anthony R. Smith
BY
Richey & Watts
ATTORNEY Patented Apr. 1, 1930

1,752,968

UNITED STATES PATENT OFFICE

ANTHONY R. SMITH, OF ELYRIA, OHIO, ASSIGNOR TO STEEL AND TUBES, INC., OF CLEVELAND, OHIO, A CORPORATION OF OHIO

LOCK

Application filed March 28, 1928. Serial No. 265,325.

This invention relates to locks for gear shifting levers and more especially to such locks for use with automobiles. It also relates to new and improved means for shifting gears; for locking the gear shifting device against the shifting of the gears; for maintaining an electrical switch in broken or circuit breaking position while the gear shifting devices are in such locked position; and it further relates to a new and improved form of electrical switch for use in a gear shifting device for automobiles; and to a new and improved coincidental lock for automobiles.

In the drawings accompanying and forming a part of the specification in which one embodiment of my invention is shown, Figure 1 is a view partly in longitudinal central section of a device embodying my invention;

Figure 2 shows in elevation a portion of the upper end of the lever which has been broken away in Figure 1;

Figure 3 is a view at substantially right angles to Figure 1 with certain parts shown in central transverse section;

Figure 4 is a top plan view of one form of switch embodying my invention;

Figure 5 is a sectional view taken on line 5—5 of Figure 4 and showing a fragment of the gear shifting lever in position relative thereto;

Figure 6 is a sectional view taken on line 6—6 of Figure 4 and showing the one position of the gear shifting lever with respect to the switch part;

Figure 7 is a fragmentary plan view of the top of the cage which carries the gear shifting members with the lever shown in section; and Figure 8 is a fragmentary sectional view taken on line 8—8 of Figure 7.

The form of device embodying my invention as shown in the drawings is designed for use in the shifting of gears in an automobile but it will be understood that by making such specific illustrations of one embodiment of my invention I am not thereby limiting the application of my invention or the extent of its use, the scope of the invention being defined in what is claimed.

In the drawings 1 designates a housing adapted in its lower portion to fit on the gear case of an automobile, the upper portion being restricted and more or less circularly formed and provided with an inwardly extending flange 2 suitably shaped to receive the ball-like member 3 of a ball and socket joint or pivot. This member 3 is held in place on the flange 2 by a coil spring 4 resting thereon and bearing against a top cap 5 which is also preferably curved to correspond with the curvature of the lower surface of the member 3 and which is held in place by a suitably shaped retainer 6 pinned to the housing 1 as by pins 7. Preferably the pins 7 project inwardly beyond the retainer 6 and seat in grooves in member 3 in a manner to permit ball and socket movement of the member 3 while preventing turning of the latter in a plane parallel to the flange 2.

The gear shifting lever 8 is secured to the member 3 by a pin 9 which passes through the lever 8 and seats at either end in the member 3. Lever 8 is provided with a handle at its upper end which may be integral with or separate from a housing 10 and which carries a lock (not shown) actuated by a key 11. The lever 8 is provided with a passage for a wire or other connecting member 12 which is operatively connected with the lock in housing 10 and with a member 13 capable of movement longitudinally of the lever 8 and is disposed in the lower portion of the latter. In this embodiment, the passage for the member 12 is provided within the lever 8 which is a hollow tube. Between the upper end of the member 13 and the pin 9 a spring 14 is disposed to urge the member 13 downwardly relative to lever 8. When the key 11 is turned the member 12 is drawn towards the housing 10, the spring 14 is compressed and the member 13 is moved relative to the lever 8 and toward housing 10.

The member 13 is provided near its lower end with laterally extending projections 15 which conveniently can be formed by a pin extending therethrough. The purpose for these projections will presently appear. The member 13 also carries a laterally extending projection or pin 16 above projections 15 and passing thru a slot in the tube of lever 8 for a purpose presently to appear.

A ring 17 is secured in place within the housing and adjacent to the flange 2 by any suitable means, for example, by screws 18. Also within the housing and spaced a short distance below the ring 17 is an electrically insulating ring 19 suitably supported within the housing, as by screws 20, which ring carries, on the surface thereof adjacent to ring 17, a pair of curved electrical contacts 21 and 22, the former being relatively short, as compared with the latter which at one end rests on the top of the former. Both of these contact members 21 and 22 have leads therefrom extending through the ring 19 and the housing 1 and terminating in binding posts 23 to which leads 24 and 25 may be secured. In the embodiment herein illustrated the leads 24 and 25 form a portion of the ignition circuit. Contact member 22 carries on one side thereof a block of electrically insulating material 26 with a lower surface curved more or less uniformly and preferably described from the central point about which the lever 8 pivots or swings. By reason of such curvature the pin 16 will contact the curved surface, when brought into engagement with it, at a given angle and with various parts of the surface regardless of the position of the lever 8. In other words, when the key 11 retracts the member 13 toward housing 10 the pin 16 contacts with the curved surface of the block 26, raises the latter and breaks the connection between contact members 21 and 22 thereby opening the switch and then maintains the block 26 in such position regardless of the universal movement of the lever 8 in the housing 1.

The housing carries in its lower portion a cage made up of upper and lower plates 27 and 28 which are spaced apart and each of which is provided with a central opening, and two aligned guides 29 and 30 which project towards each other into the central opening of plates 27 and 28 but which stop short of each other by a distance greater than the width of the member 13, these guides thus form an H opening in which the lever 8 with member 13 may move to shift gears. Each of the guides 29 and 30 is provided at its inner or free end with an arcuate slit 31 to receive the projections 15 on member 13 during shifting of the gears by the lever 8. Two gear shifting members 32 and 33 are slidably mounted in the cage on opposite sides of the guides 29 and 30, which have downwardly extending arms 34 and 35 respectively in engagement with gears to be shifted. The members 32 and 33 are cut away on their side edges adjacent to the guides 29 and 30 sufficiently to receive the lower end of member 13. The top plate 27 of the cage is pressed upwardly as indicated adjacent to the ends of the opening therein and parallel to the guides 29 and 30 to accommodate the pins 15 at the extreme ends of the movement of lever 8.

It will be noted that the guides 29 and 30 have a three-fold purpose. They guide the gear shifting members 32 and 33 in their sliding movement in the cage, they serve as lateral guides for the lever 8 when the member 13 is in engagement with the members 32 and 33; and positively prevent withdrawal of member 13 from or return of it into contact with the gear shifting members 32 and 33 from any position other than a predetermined position which is here shown as the neutral position.

It will be readily apparent to those skilled in the art that when the key 11 is turned to withdraw member 13 from engagement with members 32 and 33 the lever 8 is rendered incapable of shifting the gears and at the same time the contacts 21 and 22 of the switch are open and maintained open altho the lever 8 can be freely moved. The switch is inaccessibly mounted in the housing and the lower portion of the gear shifting lever is also inaccessibly mounted so that not only does the device function as a coincidental lock but by its construction it is not easily tampered with nor its efficiency as a lock interfered with or destroyed. The device is simple to construct and easy to operate but positive in action and highly efficient as a theft preventing device.

What is claimed is:

1. Automobile gear shifting apparatus comprising gear shifting means, a housing, a gear shifting lever pivoted in the housing for pivotal movement at all times, and an electrical switch disposed within and secured to the housing, the switch including a contact breaking member adapted to be maintained in contact breaking position in all pivotal positions of the lever when suitably engaged by said lever.

2. An electrical switch for an automobile gear shifting lock including two contact members and a circuit breaking member engaging one of the contact members, said circuit breaking member having a surface of uniform curvature for engagement of various portions thereof and at a given angle with pivoted means for actuating the circuit breaking member into and maintaining it in circuit breaking position.

3. A coincidental lock for an automobile comprising gear shifting means, a housing, a gear shifting lever mounted in the housing for universal pivotal movement, means for locking the lever against shifting of the gears by the lever, an electrical switch within the housing having a circuit breaking member provided with a surface curved about substantially the pivot point of the lever, and means carried by the lever for engaging various portions of the curved surface, thereby maintaining the switch open in all positions of the lever when the latter is in non-gear-shifting position.

4. A coincidental lock for an automobile comprising a housing, a gear shifting lever pivotally supported for universal movement in the housing, means for locking the lever against shifting of the gears thereby, an electrical switch within the housing having a contact breaking member provided with a curved surface, and a member carried by the lever and engageable at a constant angle with various portions of the curved surface during the time the lever is in said locked position to maintain the said contact breaking member in contact breaking position.

5. A coincidental lock for an automobile comprising a housing, a gear shifting lever pivotally supported for universal movement in the housing, an electrical switch inaccessibly housed within the housing, and having a contact-breaking member provided with a curved surface, means for locking the lever against shifting of the gears and for locking the switch in contact broken position, said means including a member carried by the lever and similarly engageable with the said curved surface in all positions of the lever when the latter is in locked position.

6. A coincidental lock for an automobile comprising gear shifting means, a housing, a gear shifting lever having universal pivotal movement within the housing, an electrical switch in fixed position within and relative to the housing, and means for preventing movement of the gear shifting means by the lever and for opening and maintaining the said switch in open position.

7. In a coincidental lock for automobiles, the combination of a pivoted lever for shifting gears of an automobile, an inaccessibly housed electric switch stationary with respect to the housing, and means controlled from the upper part of the lever for coincidentally locking the switch in open position and for preventing shifting of the gears by said lever, while permitting free movement of the upper end of the lever about the pivots of the lever.

8. In a coincidental lock for automobiles the combination of a pivoted lever, for shifting gears of an automobile, having an exposed upper portion and an inaccessibly housed lower portion for operative engagement with said gears, an inaccessibly housed electric switch fixed with respect to the housing, and means for coincidentally locking the switch in open position and for rendering the lower portion of the lever incapable of shifting the said gears while permitting movement of the upper portion of the lever about the pivots of the lever.

9. In a lock for automobiles the combination of a pivoted lever, for shifting the gears of an automobile, having an inaccessibly housed lower portion for operative engagement with the said gears, means controlled from the upper portion of the lever for locking the lower portion of the lever to prevent shifting of the said gears by the lever while permitting pivotal movement of the upper portion of the lever, and an inaccessibly housed electric switch spaced from the lever having a contact breaking member adapted to be maintained in open position by the lever in all positions of the lever when the latter is locked.

10. In a lock for automobiles the combination of a pivoted lever, for shifting the gears of an automobile, having an inaccessibly housed lower portion for operative engagement with the said gears, means controlled from the upper portion of the lever for locking the lever to prevent shifting of the said gears by the lever while permitting pivotal movement of the lever, and an inaccessibly housed electric switch fixed with respect to the housing having a contact breaking member adapted to be maintained in open position by the lever in all positions of the lever when the latter is locked.

11. In a lock for automobiles the combination of a pivoted lever, for shifting the gears of an automobile, having an inaccessibly housed lower portion for operative engagement with the said gears, means controlled from the upper portion of the lever for locking the lower portions of the lever to prevent shifting of the said gears by the lever while permitting pivotal movement of the upper portion of the lever, and an inaccessibly housed electric switch having a contact breaking member provided with a surface described from a point adjacent to the center of the pivotal mounting of the lever engageable, for contact breaking movement, with a suitable projection carried by the lever in all positions of the lever when the latter is locked.

12. In a lock for automobiles, the combination with a cage cut away to receive a gear shifting lever and a gear shifting member movable therein, of a pivoted gear shifting lever disconnectibly engageable with said shifting member and having a projection, and a guide for said member shaped to cooperate with said projection during pivotal movement of the lever when the latter is in engagement with said gear shifting member.

13. In a lock for automobiles, the combination with a cage cut away to receive a gear shifting lever and a gear shifting member movable therein, of a pivoted gear shifting lever disconnectibly engageable with said shifting member and having a projection, and a plurality of guides for said member shaped to cooperate with said projection during pivotal movement of the lever when the latter is in engagement with said gear shifting member.

14. In a lock for automobiles, the combination with a cage cut away to receive a gear shifting lever and a plurality of gear shifting members movable therein, of a pivoted gear shifting lever disconnectibly engageable with said shifting members and having a projection, and a guide for said members shaped to cooperate with said projection during pivotal movement of the lever when the latter is in engagement with said gear shifting members.

15. In a lock for automobiles the combination with a cage cut away to receive a gear shifting lever, and a plurality of gear shifting members movable therein, of a pivoted gear shifting lever disconnectibly engageable with said shifting members and having pin like projections extending from opposite sides of the lower end thereof, and a plurality of aligned guides for said shifting members provided with arcuate slits to receive the said projections during pivotal movement of the lever when the latter is in engagement with said gear shifting members.

16. In a lock for automobiles, a cage comprising spaced top and bottom plates each having a central opening and aligned guides between the plates and projecting toward but spaced apart from each other and each having an arcuate slit in the adjacent ends, gear shifting members slidable in the cage on opposite sides of the guides, and a pivoted lever disconnectibly engageable with said members to move the latter in the cage and having a pin extending through its lower portion for engagement in said slits during movement of the said members by the lever.

In testimony whereof I hereunto affix my signature this 17th day of March, 1928.

ANTHONY R. SMITH.